Feb. 3, 1959   G. W. BOWNESS ET AL   2,872,239
VEHICLE BODY EXTENSION
Filed Oct. 19, 1956   2 Sheets-Sheet 2
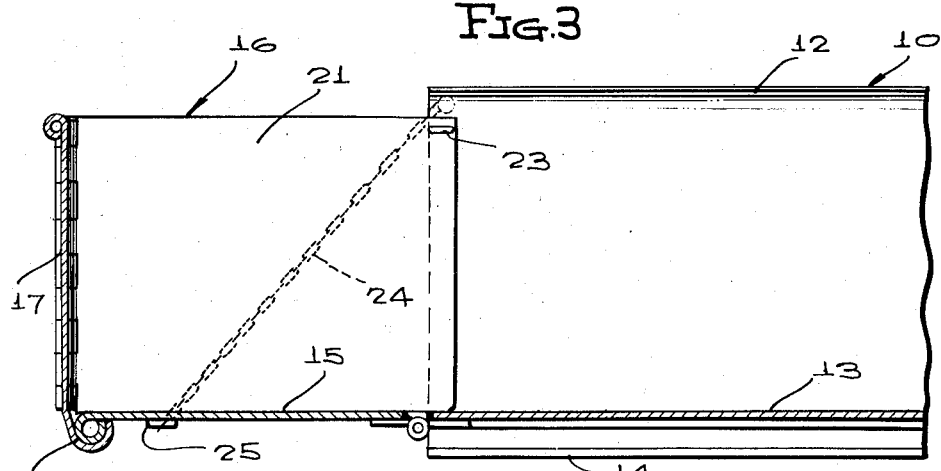
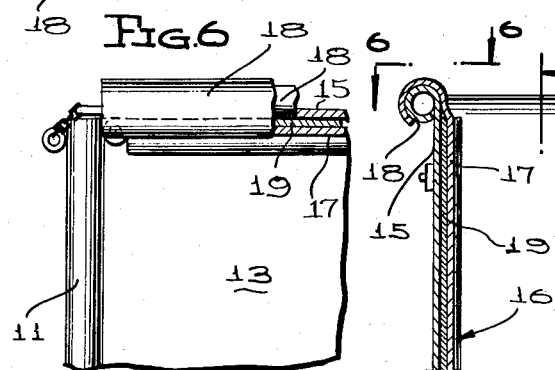
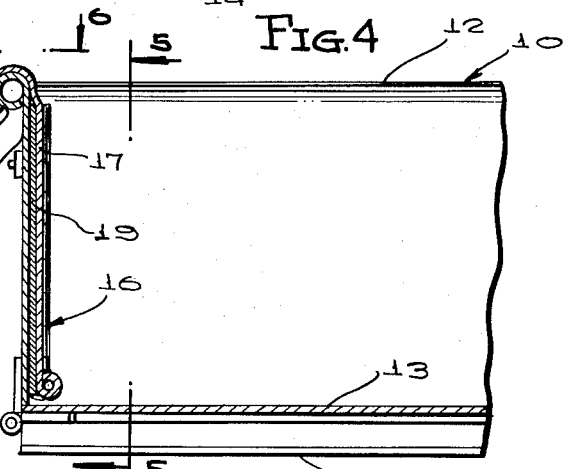
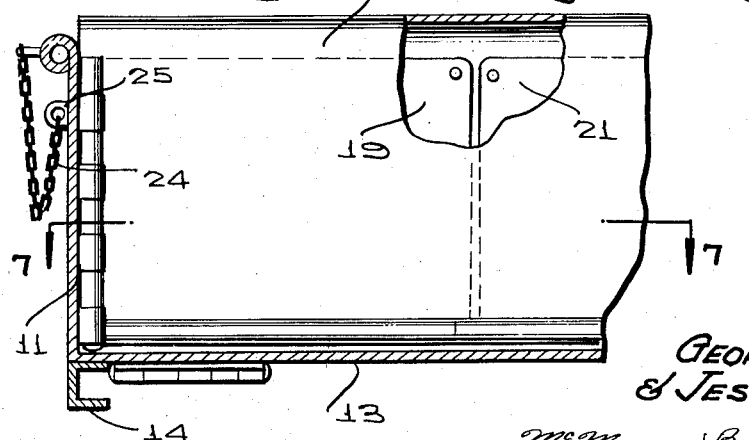
INVENTORS
GEORGE W. BOWNESS,
& JESSE SCOTT
McMorrow, Berman & Berman
ATTORNEYS

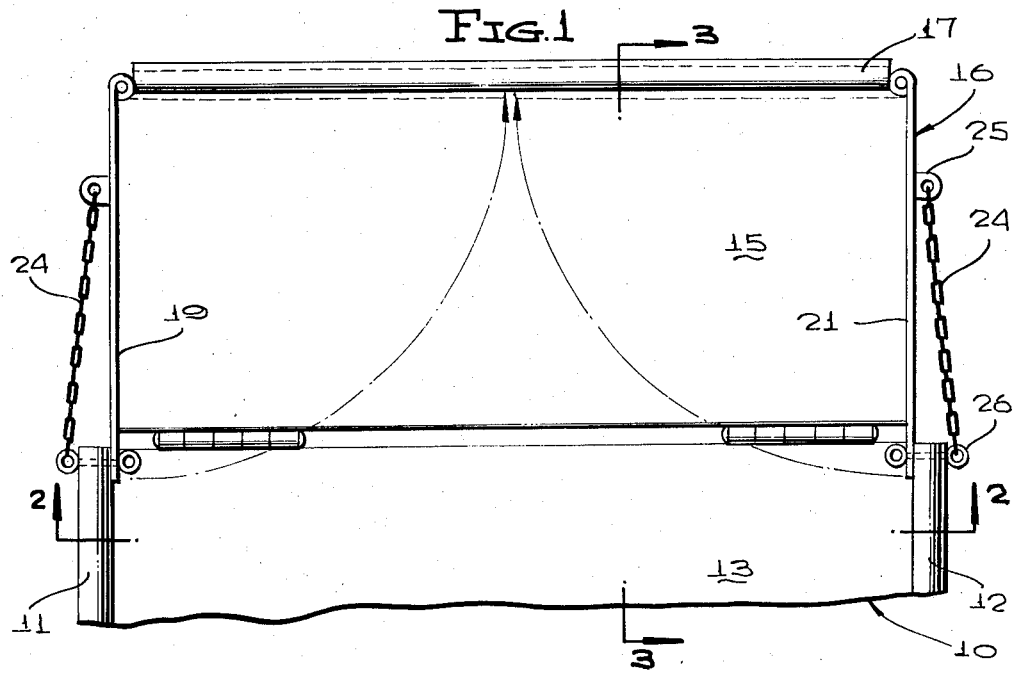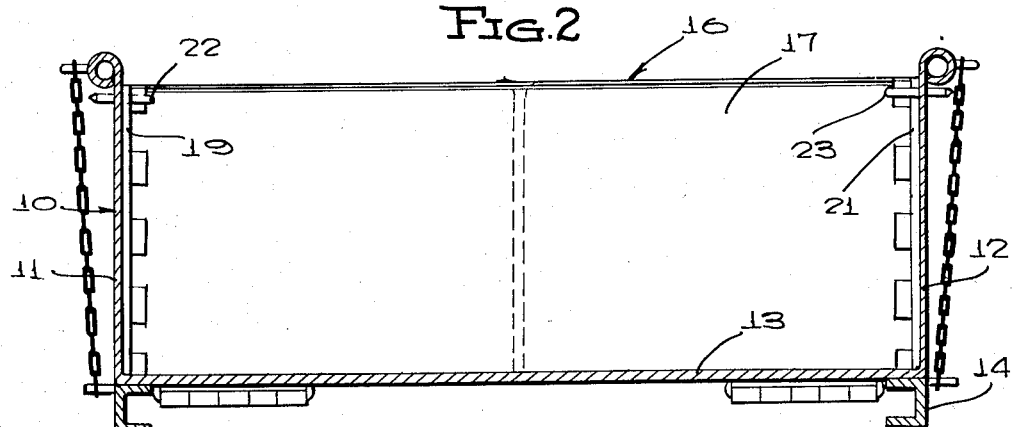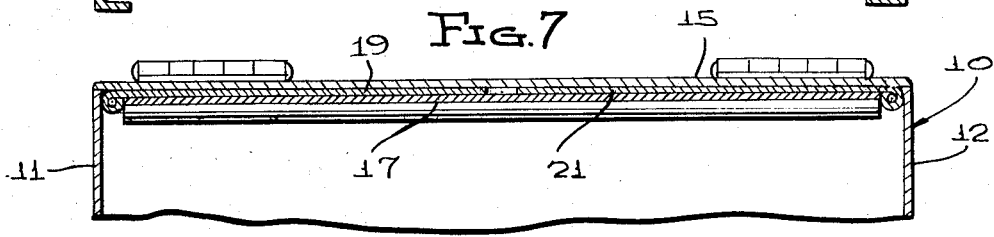

United States Patent Office 2,872,239
Patented Feb. 3, 1959

2,872,239

VEHICLE BODY EXTENSION

George W. Bowness and Jesse Scott, Cedaredge, Colo.

Application October 19, 1956, Serial No. 617,151

2 Claims. (Cl. 296—26)

The present invention relates to an extension for a vehicle box body.

An object of the present invention is to provide an extension for a vehicle box body which lends itself to easy attachment and detachment from the tailboard of said body, one which lends itself to ready extension and retraction and occupies a minimum of space when in the retracted position, one which is simple in structure and sturdy in construction requiring no tools for the attachment or detachment to the vehicle box body, one which may be economically manufactured and installed upon any box body having a tailboard, and one which is highly effective in action.

These and other objects and advantages of the present invention will be fully apparent from the following description when taken in connection with the annexed drawings, in which:

Figure 1 is a plan view of a rear portion of a truck box body, showing the tailboard in extended position and the extension of the present invention installed thereon;

Figure 2 is a view in section taken on line 2—2 of Figure 1;

Figure 3 is a view in section taken on line 3—3 of Figure 1;

Figure 4 is a sectional view, similar to Figure 3, showing the extension of the present invention in retracted or nested position;

Figure 5 is a sectional view taken on the line 5—5 of Figure 4, with a portion broken away;

Figure 6 is a fragmentary plan view as seen on line 6—6 of Figure 4; and

Figure 7 is a sectional view taken on line 7—7 of Figure 5.

Referring in greater detail to the drawings in which like numerals indicate like parts throughout the several views, the invention consists in an extension for a box body of a truck or other vehicle, the box body being indicated generally by the reference numeral 10 and including spaced side walls 11 and 12 and the bottom panel 13.

The box body 10 is mounted upon the vehicle frame 14 to which is hingedly connected one end of a tailboard 15 adjacent the open end of the box body 10. In Figures 1 to 3, inclusive, the tailboard 15 is disposed horizontally and its hinged connection to the bottom panel 13 permits it to be moved from the horizontal position to an upright position closing the open end of the box body 10, as shown in Figures 4 and 5.

The present invention consists in an extension indicated generally by reference numeral 16 and comprising a vertically disposed end panel 17 positioned adjacent the end of the board 15 remote from its hinged connection to the bottom panel 13. The free end of the tailboard 15 is provided with a tubular formation on its end, indicated by the reference numeral 18 around which is drilled the lower end of the end panel 17, thereby providing a hinged connection of the end panel 17 to the tailboard 15 and permitting the end panel 17 to be moved from the vertical position shown in Figures 1 to 3, incluisve, to a position overlying the tailboard 15 and, as shown in Figure 4, when the tailboard 15 has been moved to its upright position, the end panel 17 is within the box body 10 and is in face to face abutting relation with respect to the tailboard 15.

An upright side panel 19 is positioned adjacent one of the side edge of the tailboard 15. Another side panel 21 is similarly positioned adjacent the other side edge of the tailboard 15. The side panels 19 and 21 are hingedly connected to the adjacent side edges of the end panel 17 for swinging movement from the position adjacent the side edges of the tailboard 15 to a position overlying the adjacent portion of the end panel 17, as shown most clearly in Figures 4 and 5.

Cooperating means is provided on the side panels 19 and 21 and on the adjacent parts of the body side walls 11 and 12, respectively, for releasably holding the side panels 19 and 21 in the position adjacent the tailboard side edges, this means embodying pins 22 and 23, respectively, engageable in holes provided in the side panels 19 and 21 and in the side walls 11 and 12, as shown most clearly in Figures 2 and 3.

The box body 10 is provided with chains 24 for supporting the tailboard 15 in its horizontal position, there being provided lugs 25 and rings 26 on the tailboard and side walls, respectively, for attachment of the chains 24. This construction is conventional and not a part of the present invention.

The box body extension, according to the present invention, is preferably constructed of rigid sheet metal of sufficient weight and thickness to guarantee rigidity and sturdiness for the suport of the contents to be placed therein. The hinge connection of the end panel 17 to the tubular formation 18 is preferably such that it may be slid over either end of the tubular formation 18 for quick attachment and detachment from the tailboard 15.

The box body extension, according to the present invention, may be readily attached and detached from the vehicle box body and provides extra space for the storage of articles longer than the box body 10.

What is claimed is:

1. A readily attachable and detachable unit for installation on a box body having spaced side walls and a horizontally disposed tailboard comprising a panel adapted to be vertically positioned adjacent the free end of said tailboard and having the lower end adapted to be connected to said tailboard for movement from the vertical position to a position overlying said tailboard, an upright side panel adapted to be positioned adjacent each side edge of said tailboard and connected by one end to the adjacent side edge of said end panel for movement from the position adjacent the tailboard side edge to a position overlying the adjacent portion of said end panel, and means on said side panels cooperating with means provided on the adjacent parts of said body side walls for releasably holding said side panels in the position adjacent said tailboard side edges.

2. A readily attachable and detachable unit for installation of a box body having spaced side walls and a horizontally disposed tailboard comprising a panel adapted to be vertically positioned adjacent the free end of said tailboard and having the lower end adapted to be connected to said tailboard for movement from the vertical position to a position overlying said tailboard, an upright side panel adapted to be positioned adjacent each side edge of said tailboard and connected by one end to the adjacent side edge of said end panel for movement from the position adjacent the tailboard side edge to a position overlying the adjacent portion of said end panel, and means on said side panels cooperating with means provided on the adjacent parts of said body side walls for releasably holding said side panels in the position adjacent said tailboard side edges, said means embodying aligned hloes in said side panels and said box body side walls receivably engageable by a securing pin.

References Cited in the file of this patent

UNITED STATES PATENTS

| | | |
|---|---|---|
| 467,420 | Lemar | Jan. 19, 1892 |
| 1,571,549 | Kerth | Feb. 2, 1926 |
| 1,919,063 | Hubbard | July 18, 1933 |